Nov. 29, 1966   W. C. GIBSON   3,288,167
RELIEF VALVE
Filed Feb. 5, 1964
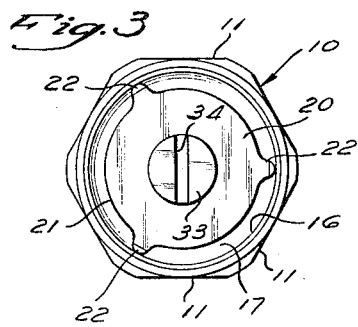
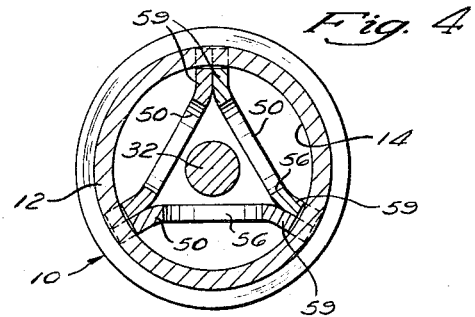
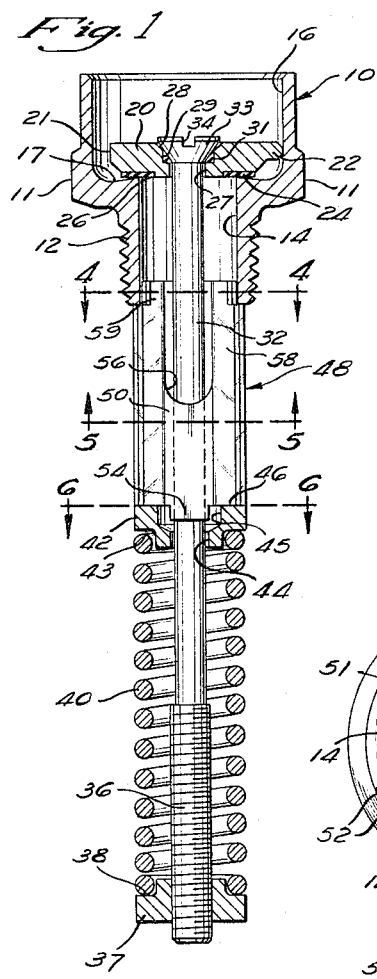
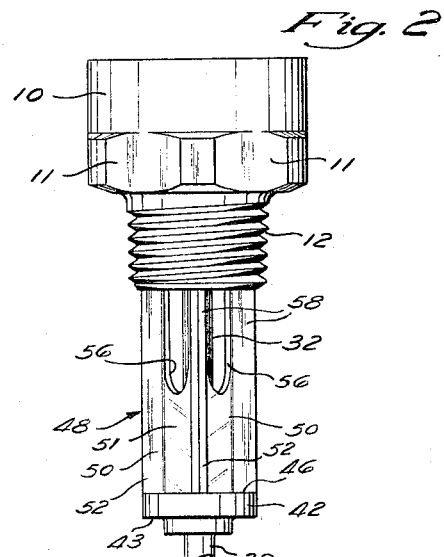
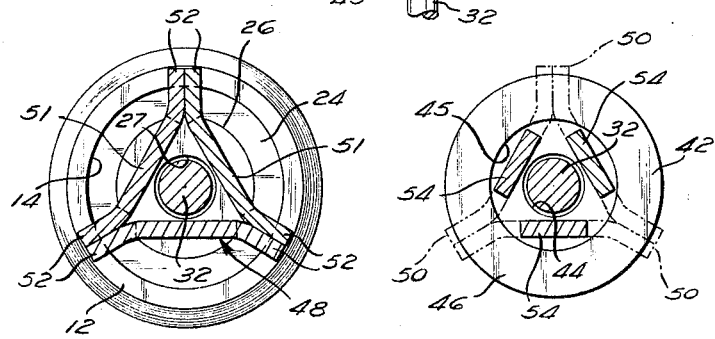
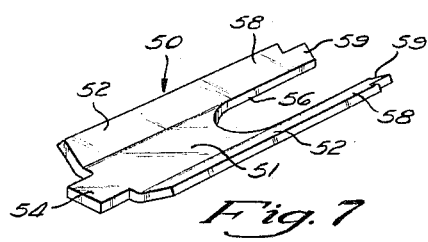
INVENTOR.
WILLARD C. GIBSON
BY
RICHEY, McNENNY & FARRINGTON
Donald W. Farrington
ATTORNEYS

United States Patent Office 3,288,167
Patented Nov. 29, 1966

3,288,167
RELIEF VALVE
Willard C. Gibson, Mentor, Ohio, assignor, by mesne assignments, to Textron Inc., Providence, R.I., a corporation of Rhode Island
Filed Feb. 5, 1964, Ser. No. 342,753
5 Claims. (Cl. 137—541)

This invention relates generally to valves and more particularly to fluid pressure responsive relief valves of the type intended to be mounted integrally in fluid pressure systems.

It is an important object of this invention to provide a novel relief valve having improved fluid flow characteristics to allow a maximum rate of fluid flow through the open valve with a minimum valve size.

It is another object of this invention to provide a novel fluid pressure relief valve which allows easy assembly and disassembly for repair, adjustment and maintenance.

It is another object of this invention to provide a novel fluid pressure relief valve which is of simple construction with a minimum number of parts to allow low cost of manufacture while retaining high flow characteristics and a high degree of accuracy of operation.

Further objects and advantages will readily become apparent to those skilled in the art upon a more complete understanding of the preferred embodiment of the invention which, briefly described, comprises a body having a valve seat and a poppet adapted to make sealing engagement with the valve seat. A stem extends through the poppet and is threaded at its lower end to receive a threaded spring abutment nut which may be adjusted along the shaft to adjust the valve. A spring extends between the abutment and a retainer which is spaced from the body by means of an adapter or spacer assembly made up of three identical stampings arranged to form a triangular assembly and having openings to provide access for fluid to the valve.

In the drawings:

FIGURE 1 is a longitudinal cross-sectional view of a relief valve according to the preferred embodiment of the invention;

FIGURE 2 is a side elevational view of the upper end of the valve of FIGURE 1;

FIGURE 3 is a top plan view of the valve of FIGURE 1;

FIGURE 4 is a cross-sectional view of the valve taken on lines 4—4 of FIGURE 1;

FIGURE 5 is a cross-sectional view taken through the adapters or spacers taken on line 5—5 of FIGURE 1;

FIGURE 6 is a cross-sectional view taken on line 6—6 of FIGURE 1; and

FIGURE 7 is a perspective view of one of the individual plates which make up the adapter or spacer assembly of the valve.

Referring now to the drawings in greater detail, the fluid pressure relief valve is shown of the type which is adapted to be screwed into a threaded opening in a pressure vessel so the valve mechanism extends into the open space in the vessel and the valve closes off the opening with a valve member which is spring biased into sealing engagement and adapted to open and move away from the valve seat whenever the pressure within the pressure vessel exceeds a predetermined limit. The body 10 therefore is provided on its outer periphery with wrench receiving flats 11 so that it may be screwed into place. A shank 12 extends downward from the upper portion of the body and has pipe threads on its outer surface to be threadedly received in a suitable opening. A bore 14 extends axially through the threaded shank 12 and at its upper end opens into an open enlarged counterbore 16. The valve seat 17 is formed on the body at the junction between the bore 14 and the counterbore 16 and is formed with a conical surface to give a seating edge adjacent the bore 14.

A poppet 20 is arranged to fit within the counterbore 16 and make sealing engagement with the valve seat 17. Poppet 20 has a cylindrical outer periphery 21 of a diameter to give sufficient clearance space with the wall of the counterbore 16 to allow free fluid flow through the counterbore out of the body whenever the valve is open. The poppet has a plurality of radial projections 22 extending beyond the outer periphery 21 and adapted to make guiding contact with the wall of counterbore 16 to insure that the poppet 20 remains centered with respect to the valve seat in both the open and closed positions. On its underside, poppet 20 carries a washer shaped sealing member 24 of suitable elastomeric material, such as rubber, to make sealing engagement with the valve seat 17. The seal member 24 is positioned around an annular shoulder 26 on the poppet and preferably is bonded directly to the poppet.

The poppet 20 has an axial bore 27 extending therethrough which opens at its upper end into a conical counterbore 28. An annular groove 29 is formed at the junction of the bore 27 and the counterbore 28 to receive a suitable annular seal 31. The valve stem 32 extends through the bore 27 and has a conical head 33 adapted to fit within the conical counterbore 28 and make sealing contact with the seal ring 31 to prevent leakage at this point. The head 33 is provided with a transverse screw slot 34 to allow the stem to be rotated for purposes of adjustment.

At its lower end, the stem 32 has a threaded portion 36 which engages a cylindrical nut 37. The nut 37 serves as a spring abutment and has an annular shoulder 38 on its upper side to receive and position a helical compression spring 40. At its upper end, the spring 40 which surrounds the stem 32 engages an annular shoulder 43 on a guide member 42 which has a bore 44 extending therethrough to loosely receive the stem 32. The guide 42 at its upper side has an enlarged cylindrical counterbore 45 adjacent the flat annular top surface 46.

A spacer assembly indicated at 48 is positioned around the stem 32 between the guide 42 and the body 10 to maintain the guide 42 a spaced distance from the body 10 and insure that when the valve components are held in compression by means of the tension of spring 40 the valve will be a unitary assembly. The spacer assembly 48 is made up of three identical plates 50 which are preferably formed as stampings out of flat steel sheet. As shown in greater detail in FIGURE 7, each of the plates 50 has a flat central portion 51 and edge portions 52 on each side which are bent at an angle of approximately 30° with respect to the flat portion 51. This arrangement permits three of the plates 50 to be fitted together with the adjacent edges 52 of the plates in abutting contact as shown clearly in FIGURE 5. When the plates are fitted together in this position they will form a triangular beam assembly having an opening therein through which the stem 32 extends.

At the lower end, a rectangular tab 54 extends from the flat portion 51 and is of such a width that it will be received within the counterbore 45 of the guide 42 when the valve is assembled in such an arrangement that the circumscribed circle defined by the tabs 54 of the three plates will be substantially equal to the diameter of the counterbore 45 so as to secure the three plates 50 in position against radial movement.

At its upper end, each of the plates 50 has a U-shaped notch 56 formed by cutting away the flat portion 51 to leave the bent edges as a pair of legs 58. At the end of each of the legs 58 is a projecting tab 59 which is arranged so that when the three plates are assembled together, the six tabs 59 formed on the three plate members will have a circumscribed circle substantially equal to that of the bore 14 in the body so that when the tabs are within this bore the three plates will be secured together at the upper end.

As will be seen, the tabs 54 at the lower end and the tabs 59 at the upper end serve when the valve is fully assembled to retain the three plates in position without any welding or other fastening means between the plates. Thus, when the valve is assembled it is merely necessary to assemble the plates together with the guide 42 and spring 40. The poppet 20 is then placed in position and the stem 32 fitted inward from the upper end. The nut 37 is then screwed on to the threaded portion of the stem and the tensioning effect of the spring 40 may then be easily adjusted by rotating the nut 37 on the stem 32 which may be held by means of a screwdriver slot 34 against rotation. Since the pressure which the valve will open depends upon the effective area of the poppet 20 determined by the diameter bore 14 and the biasing force of the spring 40, the valve may be easily adjusted to open at any desired pressure.

Whenever it is desired to disassemble the valve for cleaning or repair, it is merely necessary to unscrew the nut 37, after which all of the component parts will readily come apart into their separate pieces.

Because each of the plates 50 may be made of relatively thin material, they do not block fluid access to the lower end of the bore 14. Fluid flow is further improved by the notches 56 so that the only portions of the plate 50 which reduce the effective area of bore 14 at its lower end are merely the six tabs 59. Thus, the plates 50 provide a minimum of restriction of fluid flow around the bore 14 and further serve as guides to break up turbulence of fluid entering the bores so as to provide a maximum ease of entry of fluid into the bore 14 when the valve is open.

Although the preferred embodiment of this invention has been shown and described in detail, it is recognized that various modifications and rearrangements will readily suggest themselves to those skilled in the art upon understanding of the present invention, and such modifications and rearrangements may be resorted to without departing from the scope of the invention as defined in the following claims.

What is claimed is:

1. A relief valve comprising a body having a fluid passage bore extending axially therethrough, a valve seat at the outer end of said bore, a poppet adapted to make sealing engagement with said valve seat, a stem secured to said poppet and extending axially through said bore beyond the inner end thereof, a first spring abutment on said stem spaced from the inner end of said bore, a compression spring around said stem having one end engageable with said first abutment, and spacer means providing a second spring abutment for the other end of said spring a spaced distance from said body, said spacer means comprising three separate identical members having substantially flat center sections adapted to fit together in edge abutting relationship in longitudinal alignment to form a rigid triangular box around said stem, each of said members extending from said body to a point adjacent the other end of said spring.

2. A relief valve comprising a body having a fluid passage bore extending axially therethrough, a valve seat at the outer end of said bore, a poppet adapted to make sealing engagement with said valve seat, a stem secured to said poppet and extending axially through said bore beyond the inner end thereof, a first spring abutment on said stem spaced from the inner end of said bore, a compression spring around said stem having one end engageable with said first abutment, and spacer means providing a second spring abutment for the other end of said spring a spaced distance from said body, said spacer means comprising a guide abutting said other end of said spring and three separate identical members having substantially flat center sections adapted to fit together in edge abutting relationship in longitudinal alignment to form a rigid triangular box around said stem, each of said members extending from said body to said guide.

3. A relief valve comprising a body having a fluid passage bore extending axially therethrough, a valve seat at the outer end of said bore, a poppet adapted to make sealing engagement with said valve seat, a stem secured to said poppet and extending axially through said bore beyond the inner end thereof, a first spring abutment on said stem from the inner end of said bore, a compression spring around said stem having one end engageable with said first abutment, and spacer means providing a second spring abutment for the other end of said spring a spaced distance from said body, said spacer means comprising a guide abutting said other end of said spring and a plurality of separate members adapted to fit together in longitudinal alignment to form a rigid box around said stem, said guide having a cylindrical counterbore, each of said members extending from said body to said guide and having projecting tabs at each respectively engaging said counterbore and said bore, said engagement of said tabs with said counterbore and said bore providing the sole means of restraining said members against radially outward movement relative to each other.

4. A relief valve comprising a body having a fluid passage bore extending axially therethrough, a valve seat at the outer end of said bore, a poppet adapted to make sealing engagement with said valve seat, a stem secured to said poppet and extending axially through said bore beyond the inner end thereof, a first spring abutment on said stem spaced from the inner end of said bore, a compression spring around said stem having one end engageable with said first abutment, and spacer means providing a second spring abutment for the other end of said spring a spaced distance from said body, said spacer means comprising a guide abutting said other end of said spring and a plurality of members adapted to fit together in longitudinal alignment to form a rigid box around said stem, each of said members extending from said body to said guide, each of said members having a flat center section and longitudinally extending edges bent at an angle to said center section to permit the edges of adjacent members to mate in surface abutting contact when assembled, each of said members having longitudinally projecting tabs engaging said guide and said bore to retain said members in position.

5. A relief valve comprising a body having a fluid passage bore extending axially therethrough, a valve seat at the outer end of said bore, a poppet adapted to make sealing engagement with said valve seat, a stem secured to said poppet and extending axially through said bore beyond the inner end thereof, a first spring abutment threadedly mounted on said stem at a point spaced from the inner end of said bore, a compression spring around said stem having one end engageable with said first abutment, and spacer means providing a second spring abutment for the other end of said spring a spaced distance from said body, said spacer means comprising a guide around stem abutting the other end of said spring, said guide having a counterbore facing said body, and a plurality of members adapted to fit together in longitudinal alignment to form a rigid box around said stem, each of said members extending from said body to said guide, each of said members having a flat center section and longitudinally extending edges bent at an angle to said center section to permit the edges of adjacent members to mate in surface abutting contact when assembled, each of said members having a tab projecting longitudinally from one end of said center section to engage said guide counterbore, the other end of said center section being cut away to form a slot between the bent edges, each of said edges having a tab projecting longitudinally from the end to engage said body bore to retain said members in position.

References Cited by the Examiner

UNITED STATES PATENTS

| | | | |
|---|---|---|---|
| 1,659,478 | 2/1928 | Black | 137—541 X |
| 2,608,210 | 8/1952 | St. Clair | 137—541 |
| 2,834,374 | 5/1958 | Klinkenberg | 137—541 |

FOREIGN PATENTS 258,029   9/1926   Great Britain.

ALAN COHAN, *Primary Examiner.*
WILLIAM F. O'DEA, *Examiner.*
D. LAMBERT, *Assistant Examiner.*